United States Patent [19]
Sudo et al.

[11] Patent Number: 5,908,686
[45] Date of Patent: Jun. 1, 1999

[54] MODIFIED POLYSILOXANE COMPOSITION AND A SANITARY RUBBER ARTICLE COATED WITH THE COMPOSITION

[75] Inventors: Morihiro Sudo, Tokyo; Tomoyasu Muraki, Abiko; Eiji Kawachi, Kiryu; Yasushi Kawachi, Ashikaga, all of Japan

[73] Assignee: Daikyo Gomu Seiko, Ltd, Tokyo, Japan

[21] Appl. No.: 08/863,294

[22] Filed: May 27, 1997

Related U.S. Application Data

[63] Continuation of application No. 07/971,462, Nov. 4, 1992, abandoned.

[30] Foreign Application Priority Data

Jan. 23, 1992 [JP] Japan .................................. 4-010085

[51] Int. Cl.$^6$ ...................................................... B32B 7/02
[52] U.S. Cl. ........................ 428/215; 522/148; 428/447; 524/268; 524/262; 524/263; 524/264; 524/731
[58] Field of Search ..................... 524/268, 262, 524/263, 264, 731; 522/148; 528/24; 428/447, 215

[56] References Cited

U.S. PATENT DOCUMENTS

| | | | |
|---|---|---|---|
| 3,684,756 | 8/1972 | Brooks ..................................... | 524/731 |
| 4,429,062 | 1/1984 | Pasztor et al. .......................... | 523/118 |
| 4,451,634 | 5/1984 | Hatanaka et al. ........................ | 528/24 |

FOREIGN PATENT DOCUMENTS

| | | |
|---|---|---|
| 0296878 | 12/1988 | European Pat. Off. . |
| 0395077 | 10/1990 | European Pat. Off. . |
| 0470745 | 2/1992 | European Pat. Off. . |
| 2245729 | 4/1975 | France . |
| 1078326 | 3/1960 | Germany . |

OTHER PUBLICATIONS

Showa Gum, Database WPIL, Section Ch. Week 8251, Class A, AN 82–09949J (1982).

*Primary Examiner*—Melvyn I. Marquis
*Attorney, Agent, or Firm*—Wenderoth, Lind & Ponack, L.L.P.

[57] ABSTRACT

A sanitary rubber article coated with a film composed of a siloxane composition comprising the following Component A and the following Component B, Component B being present in a proportion of 0.1 to 5 parts by weight to 100 parts by weight of Component A:

Component A at least one organosiloxane having a recurring unit represented by the following General Formula (I):

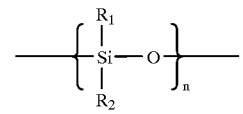

Component B at least one of organopolysiloxanes having a recurring unit represented by the following General Formula (II):

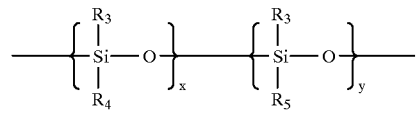

wherein $R_1$ to $R_5$, n, x and y are defined in the specification.

7 Claims, 1 Drawing Sheet

2 UPPER PART OF RUBBER STOPPER
3 COATING FILM OF MODIFIED POLYSILOXANE COMPOSITION
1 LEG PART OF RUBBER STOPPER

3 COATING FILM OF MODIFIED POLYSILOXANE COMPOSITION
4 SLIDING PART OF INJECTION CYLINDER

MODIFIED POLYSILOXANE COMPOSITION AND A SANITARY RUBBER ARTICLE COATED WITH THE COMPOSITION

This application is a continuation application of now abandoned Ser. No. 07/971,462, filed Nov. 4, 1992.

BACKGROUND OF THE INVENTION

1. Field of the Invention

This invention relates to a composition for a surface modifying agent and in particular, a modified polysiloxane composition capable of forming a film having improved surface properties such as lubricity, non-adhesiveness, etc. on a surface of a rubber article and more specifically, it is concerned with a sanitary rubber article such as a rubber stopper for a medicament, instrument or device for medical treatment, etc. having improved and excellent surface properties by coating the surface with the said composition.

2. Prior Art

Various methods have hitherto been proposed for the purpose of improving the surface property of a molded rubber material, for example, decreasing the surface friction resistance, imparting a solvent resistance, water repellence or ozone resistance, removing the adhesiveness, etc. For example, there have been proposed a process comprising holding a rubber article in chlorine or bromine gas or in a solution of sodium sulfonate (Japanese Patent Publication No. 3807/1982), a process comprising holding a fluorine gas atmosphere (Japanese Patent Publication No. 19464/1983 and Japanese Patent Laid-Open Publication No. 218830/1984), a process comprising coating a rubber surface with an organopolysiloxane composition such as containing an organopolysiloxane having two or more hydroxyl groups bonded to silicon atoms in one molecule, polydiorganosiloxane with both terminal hydroxyl groups blocked, polyorganohydrogensiloxane, epoxy group-containing siloxane and amino- or alkoxy group-containing siloxane, followed by hardening (Japanese Patent Publication No. 47864/1981), a process comprising preparing a medical or sanitary rubber article by incorporating 0.1 to 10% by weight of an organo silicon compound capable of moving little by little in the rubber (Japanese Patent Publication No. 30089/1972), a process comprising coating the surface of a rubber molded article with a silcone raw rubber containing hydroxyl or methoxy groups in the molecule by crosslinking (Japanese Patent Laid-Open Publication No. 96837/1982) and a process comprising producing a rubber stopper by coating and crooslinking a polydimethylsiloxane or a polydimethylsiloxane in which a part of the dimethyl groups is replaced by phenyl groups, vinyl groups, fluorine-containing groups, polyether groups, alkylallyl groups or fatty acid groups (Japanese Patent Laid-Open Publication No. 182418/1982). The inventors have also proposed a process comprising coating a rubber surface with a silane coupling agent containing amino groups as disclosed in Japanese Patent Laid-Open Publication No. 104672/1981) and a sanitary rubber article coated with a modified polysiloxane and a process for the production of the same (Japanese Patent Laid-Open Publication Nos. 318944/1988 and 62170/1989).

In polysiloxane compositions prepared for coating, however, various organic solvents for controlling the viscosity of the compositions and mixing and dissolving various additives are used as a conventional technique, but there is no solvent capable of satisfying all required properties, for example, solubility of the polysiloxane composition, compatibility with the surface of a rubber article, etc.

Since a crosslinking reaction in a polysiloxane composition starts after evaporation of a solvent, there occur delay of the reaction starting time and a large dispersion of the reaction state, depending on the evaporation state of the solvent used, thus causing sliding of the coated film surface of the modified polysiloxane composition, unevenness of the thickness thereof and stripping from the rubber surface.

In a modified polysiloxane-coated saniatry article and a process for the production of the same, the inventors have proposed in Japanese Patent Laid-Open Publication Nos. 318944/1988 and 62170/1989, examples are given in which irradiation of ultraviolet rays was carried out as a means for crosslinking and bonding a modified polysiloxane composition, but it has been desired to further improve the uniformity of the reaction, prevent the polysiloxane film from fine stripping and further shorten the reaction time.

SUMMARY OF THE INVENTION

It is an object of the present invention to provide a modified polysiloxane composition whereby the above described problems can be solved.

It is another object of the present invention to provide a modified polysiloxane composition capable of forming a coating film on a surface of a sanitary rubber article, the coating film having very excellent homogeneity, improved lubricity and high productivity and being obtained by rendering uniform the reaction and shortening the reaction time.

It is a further object of the present invention to provide a sanitary rubber article coated with the above described modified polysiloxane composition.

These objects can be attained by a modified polysiloxane composition comprising the following Component A and the following Component B, Component B being present in a proportion of 0.1 to 5 parts by weight to 100 parts by weight of Component A, and by a sanitary rubber article whose surface is coated with the said modified polysiloxane composition:

Component A
at least one of organopolysiloxanes having a recurring unit represented by the following General Formula (I):

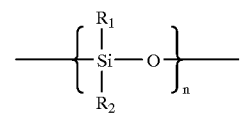

wherein $R_1$ is a group selected from the group consisting of alkyl groups containing 1 to 7 carbon atoms, $R_2$ is a group selected from the group consisting of non-substituted or fluorine-substituted alkyl groups containing 1 to 4 carbon atoms, phenyl group and vinyl group, $R_1$ and $R_2$ may be same or different and n is an integer of 1 to 10, Component B
at least one of organopolysiloxanes having a recurring unit represented by the following General Formula (II):

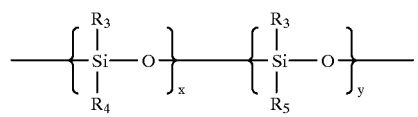

wherein $R_3$ is a group selected from the group consisting of non-substituted or fluorine-substituted alkyl groups containing 1 to 7 carbon atoms and phenyl group, $R_4$ is a group or atom selected from the group consisting of alkenyl groups, epoxy group, acryloyl group, vinyloxy group, maleimide group, vinyl group, phenylketone group, hydroxyl group and hydrogen atom, $R_5$ is a group selected from the group consisting of alkyl groups containing 1 to 7 carbon atoms, alkoxy groups containing 1 to 4 carbon atoms, amino group and carboxyl group, x and y are integers in the range of $1 \leq x \leq 40$ and $20 \leq x+y \leq 50,000$.

In a particularly preferred embodiment of the present invention, the above described Component A is a mixture of chain organopolysiloxanes and/or cyclic organopolysiloxanes.

BRIEF DESCRIPTION OF THE DRAWINGS

The accompanying drawings illustrate the principle and merits of the present invention in detail.

DETAILED DESCRIPTION OF THE INVENTION

Figure 1:
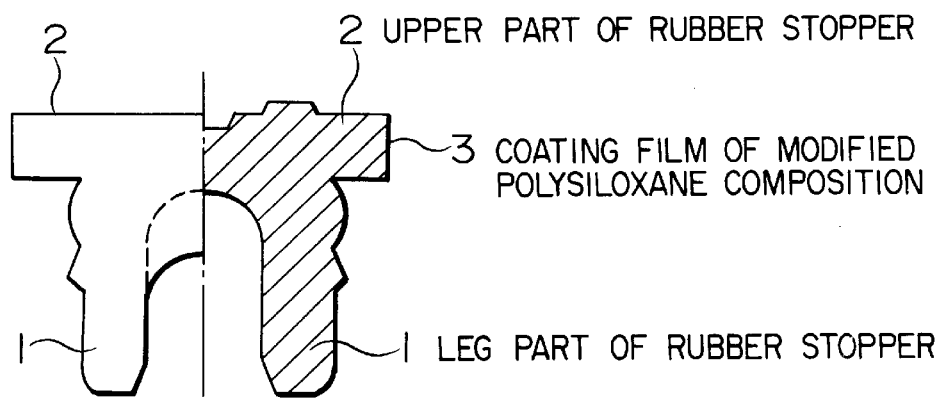
FIG. 1 is a cross-sectional view of one embodiment of a rubber stopper for medicament (rubber stopper for freeze drying) according to the present invention.

The inventors have made various studies on organopolysiloxanes as a constitutional component of the modified polysiloxane composition and consequently, have found that a film can be formed without using any solvent by selecting, as a predominant component, Component A being an organopolysiloxane having the recurring unit of the above described General Formula (I) and adding an organopolysiloxane of Component B to Component A in a specified mixing proportion to compose a modified polysiloxane composition, whereby the problems having hitherto been considered serious can be solved. i.e. improvement of the lubricity, prevention of the film from stripping due to stabilization of the reaction quantity, shortening of the processing time due to large increase of the reaction and crosslinking rate. Furthermore, the inventors have continued detailed studies on the variety and additive quantity of modified polysiloxanes and thus have completed the present invention.

Component A of the modified polysiloxane composition according to the present invention will first be illustrated below: Component A comprises an organopolysiloxane having the recurring unit represented by the following General Formula (I), preferably a mixture of chain polyorganosiloxanes and/or cyclic polyorganosiloxanes,

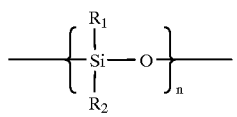

wherein $R_1$ is an alkyl group of 1 to 7 carbon atoms, for example, methyl, ethyl, propyl, butyl, amyl, hexyl, heptyl groups, etc., $R_2$ is a non-substituted or fluorine-substituted alkyl group containing 1 to 4 carbon atoms, for example, methyl, ethyl, propyl, butyl, perfluoroethyl, fluoropropyl groups, etc., $R_1$ and $R_2$ may be same or different, and n is an integer of 1 to 10, preferably 1 to 5.

Component A has preferably a vsicosity of 0.65 to 15,000 centistokes. When an organopolysiloxane of Component A having a viscosity within this range is mixed with Component B in a predetermined proportion by weight, the viscosity can be sontrolled so that coating of a surface of a rubber article be readily accomplished and a very thin film be obtained.

Examples of the organopolysiloxane compound as Component A in the composition of the present invention include dimethylpolysiloxane, methylphenylpolysiloxane, methylvinylpolysiloxane, fluoropropylmethylpolysiloxane, methylpolysiloxane, polysiloxanes having chain structure or cyclic structures shown in Table 1 and the like. However, Component A is not limited to these examples. For example, HD 3 and HD 5 in Table 1 are cyclic organosiloxanes. In the present invention, Component A can be a mixture of two or more polysiloxane compounds of General Formula (I) either in chain or cyclic forms.

TABLE 1

| Component A: Polysiloxane Compound | | |
|---|---|---|
| Chemical Formula | Abbr. | Boiling Point (° C.) |
| $(CH_3)_3SiO[SiH(CH_3)O]Si(CH_3)_3$ | | 141 |
| $[H(CH_3)SiO]_3$ | HD 3 | 93 |
| $[H(CH_3)SiO]_5$ | HD 5 | 168 |
| $[CH_3O(CH_3)_2Si]_2O$ | | 139 |
| $[C_2H_5O(CH_3)_2Si]_2O$ | | 161 |
| $[CH_2=CH(CH_3)_2Si]_2O$ | | 131 |
| $[CH_2=CH(CH_3)SiO]_6$ | | 296 |
| $[CF_3CH_2CH_2Si(CH_3)O]_3$ | FM | 95/3 mmHg |
| $(CH_3)_3SiOSi(CH_3)_3$ | MM | 100 |
| $(CH_3)_3SiO(CH_3)_2SiOSi(CH_3)_3$ | MDM | 153 |
| $(CH_3)_3SiO[(CH_3)_2SiO]_2Si(CH_3)_3$ | MD2M | 194 |
| $(CH_3)_3SiO[(CH_3)_2SiO]_3Si(CH_3)_3$ | MD3M | 229 |
| $[(CH_3)_2SiO]_3$ | D 3 | 134 |
| $[(CH_3)_2SiO]_4$ | D 4 | 175 |
| $[(CH_3)_2SiO]_5$ | D 5 | 210 |
| $[(CH_3)_2SiO]_6$ | D 6 | 245 |
| $[(CH_3)_2SiO]_3[CH_3SiO_{1.5}]_3$ | | 203 |
| $[(C_2H_5)_2SiO]_5$ | | 167 |
| $(C_6H_5)_2Si[OSi(CH_3)_3]_2$ | | 172 |
| $H(CH_3)_2SiOSi(CH_3)_3$ | HM | 85 |
| $[H(CH_3)_2Si]_2O$ | HS | 70 |

Then, the organopolysiloxane of Component B will be illustrated. The organopolysiloxane of Component B is included in the materials disclosed in Japanese Patent Laid-Open Publication No. 318944/1988 and 62170/1989, which is represented by the following General Formula (II):

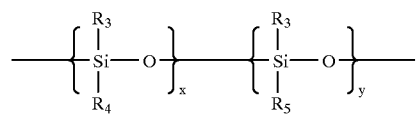

wherein $R_3$ is a non-substituted or fluorine-substituted alkyl group containing 1 to 7 carbon atoms, for example, methyl, ethyl, propyl, butyl, amyl, hexyl, heptyl, perfluoroethyl, fluoropropyl groups, etc., or phenyl group, $R_4$ is an alkenyl group, epoxy group, acryloyl group, vinyloxy group, maleimide group, vinyl group, phenylketone group, hydroxyl group and hydrogen atom, $R_5$ is an alkyl group containing 1 to 7 carbon atoms (specifically, the non-substituted alkyl group as exemplified in $R_3$), alkoxy group containing 1 to 4 carbon atoms, for example, methoxy, ethoxy or propyleneoxide group, amino group and carboxyl group, x and y are integers in the range of $1 \leq x \leq 40$ and $20 \leq x+y \leq 50,000$.

The total number of $R_4$ substituents in the molecule of the organosiloxane compound of Component B are in the range of 1 to 40, amounting to 0.001 to 5 mole %. The more the content of $R_4$ substituents, the larger the crosslinking bonding strength to a rubber surface and the strength of the modified polysiloxane coating film, and the less the degree of stripping of the coating film. When the content of $R_4$ substituents exceeds 5 mole %, the hygroscopicity is increased and the lubricity is decreased.

Component B, organopolysiloxane compound of the present invention has preferably a mean molecular weight of 2,000 to 5,000,000 and a degree of polymerization of $1 \leq x \leq 40$ and $20 \leq x+y \leq 50,000$ in General Formula (II). If the degree of polymerization is less 20, the strength of the coating film is lowered, while if more than 50,000, the viscosity of the composition is too increased to form a uniform and thin film during processing.

Examples of Component B, organopolysiloxane compound of the present invention are dimethylpolysiloxane, methylvinylpolysiloxane, methylphenylpolysiloxane, methylhydrosiloxane, diphenyldimethylsiloxane, aminoethyldimethylpolysiloxane, fluoropropylmethylpolysiloxane, etc. Component B is not limited to these examples.

When the viscosity of the modified polysiloxane composition is controlled by the use of at least one of various organic solvents such as methyl ethyl ketone, diethyl ketone, toluene, acetone, 1,1,1-trichloroethane, n-hexane, trichlorotrifluoroethane and tetrahydrofuran according to the prior art, a crosslinking reaction starts by evaporation of the solvent in the modified polysiloxane composition and drying should be carried out for a long time so as to obtain a sufficiently crosslinked coating film.

When the solvent has the higher compatibility (solubility) with the modified polysiloxane composition or rubber composition of a sanitary rubber artile, the more uniform and stable modified polysiloxane composition can be given, but evaporation of the solvent from the surface of the coating film or rubber article is so slow that a large amount of the solvent remains.

The aboved described problems can be solved by combining Component B with Component A. That is, since the organopolysiloxane of Component A and the organopolysiloxane of Component B, of the present invention, are of the same kind, these components are readily mixed and compatible and are hardly permeated and diffused from the surface of a rubber article into the rubber. The organopolysiloxane of Component A is readily reacted by a sensitizer and/or radical producing agent added to the modified polysiloxane composition to increase the crosslinking reactivity of the modified polysiloxane composition, so there can be obtained a modified polysiloxane coating film being enriched in lubricity and hardly stripped and a rubber article coated with the said coating film on the surface thereof according to the present invention.

The content of Component B contained in the modified polysiloxane composition of the present invention is in a proportion of 0.1 to 5 parts by weight to 100 parts by weight of Component A, since if the content of Component B is more than 5 parts by weight, the film becomes thicker and the crosslinking property is increased to improve the bonding strength, but on the other hand, the sliding property is degraded, while if less than 0.1 part by weight, there arises a problem on the quality as a sanitary rubber article that the bonding strenght of the film is lowered and fine particles are increased due to stripping of the film. More preferably, the content of Component B is in the range of 0.5 to 3 parts by weight.

The film formed on a rubber surface with the modified polysiloxane composition of the present invention has ordinarily a thickness of 0.1 to 50 $\mu$m, preferably 0.1 to 1 $\mu$m.

The organopolysiloxanes of Components A and B, used in the present invention, can be prepared by a known technique, such as hydrolysis in a solvent, ester exchange, dehydration, substitution, condensation reaction, etc.

To the modified organopolysiloxane composition can be added an aromatic ketone compound as a sensitizer and/or an organic peroxide as a radical producing agent so as to promote reaction of Component A and Component B and to crosslink and bond them to a surface of a vulcanized rubber. An antioxidant can be added thereto.

Examples of the aromatic ketone compound used as a sensitizer are benzophenone, benzoinbutyl ether, 2,2-dimethoxy-2-phenylacetophenone, 1-hydroxycyclohexylphenyl ketone, 1-(4-isopropylphenyl)-2-hydroxy-2-methylpropane, 2,4-diethylthioxanthone and the like. The technique concerning the activation with these compounds can be carried out by a known technique as disclosed in "Hikari Hoshasen Koka Gijutsu (Light and Radiation Hardening Technique)" edited by Taiseisha Co. and "Kobunshi Tenkazai No Saishin Gijutsu (Latest Technique of High Molecular Additives)" edited by CMC Co.

The sensitizer is generally added in a proportion of 0.02 to 2 parts by weight to 100 parts by weight of the modified organopolysiloxane composition.

As the organic peroxide as a radical producing agent, there are used organic peroxides capable of increasing the function thereof together with the aromatic ketone compounds, for example, 1,3-di(t-butylperoxyisopropyl) benzene, 1,1-di(t-butylperoxy)-3,3,5-trimethylcyclohexane, 2,5-dimethyl-2,5-di(t-butylperoxy)hexyne-3, t-butylcumyl peroxide, n-butyl-4,4-bis(t-butylperoxy) valerate, 2,5-dimethyl-hexa-2,5-dihydroperoxide, di-t-butyl peroxide, benzoyl peroxide and the like.

The radical producing agent is preferably added in a proportion of 0.01 to 3 parts by weight to 100 parts by weight of the modified organopolysiloxane composition.

Examples of the antioxidant used in the modified organopolysiloxane composition are 2,6-di-t-butyl-4-methylphenol, tetrakis[methylene-3-(3,5-di-t-butyl-4-hydroxyphenol)propionate]methane, n-octadecyl-3-(4'-hydroxy-3',5'-di-t-butylphenol)propionate, dilauryl thiopropionate and the like.

The antioxidant is preferably added in a proportion of 0.01 to 0.5 part by weight to 100 parts by weight of the modified organopolysiloxane composition.

In the present invention, as a raw rubber material of a molded rubber article whose surface is coated with the modified organopolysiloxane composition, there are used diene rubbers sch as isoprene rubber (IR), butadiene rubber (BR), styrene-butadiene rubber (SBR), natural rubber and the like, butyl rubbers (IIR, BIIR, CIIR, etc.), olefinic rubbers such as ethylene-propylene rubbers, ethylene-propylene terpolymers (EPM, EPDM, etc.) and the like, and thermoplastic elastomers, as well known in the art. In addition, other known addtives such as crosslinking agents, crosslinking aids, reinforcing agents, etc. can be added to such a rubber, followed by heating and crosslinking.

The modified organopolysiloxane composition of the present invention comprising Component A, Component B, a sensitizer, radical producing agent, antioxidant, etc., as described above, is coated onto a surface of a saniatry rubber article and then heated and/or irradiated by a high energy ray such as ultraviolet rays, electron beam, laser beam, etc., whereby to form a strong coating film on the surface of the rubber article and crosslink and bond it thereto.

When the modified organopolysiloxane composition coated onto the rubber surface is treated by heating in an oven or using infrared rays, a good film can be obtained at a temperature of 90 to 120° C. for 3 to 5 minutes.

The modified organopolysiloxane composition of the present invention can be crosslinked and bonded by irradiating a high energy ray such as ultraviolet rays or laser beam (YAG laser, wavelength 10.6 $\mu$m) and accordingly, the treatment time can be shortened, thus obtaining a uniform film. For example, a good film can be formed by irradiating an ultraviolet ray of 220 to 400 nm generated from a lamp enclosing mercury and argon gas in a quartz tube for 5 to 20 minutes at room temperature.

The following examples are given in order to illstrate the present invention in detail without limiting the same, in which parts are to be taken as those by weight unless otherwise indicated.

Examples 1 to 7 and Comparative Examples 1 to 3 a) Rubber Compounding and Molding

| | |
|---|---|
| BR (JSR BR01: commercial name, made by Japan Synthetic Rubber Co.) | 80 parts |
| IR (Nipol IR 2200: commercial name, made by Nippon Zeon Co. ) | 20 |
| Zinc White No. 1 (Mitsui No. 1 Zinc White: commercial name, made by Mitsui Kinzoku KK) | 1 |
| Titanium Oxide (Tipaque A-100: commercial name, made by Ishihara Sangyo KK) | 15 |
| 2,5-Dimethyl-2,5-di(t-butylperoxy)hexane (Perhexa 2.5 B: commercial name, made by Nippon Yushi KK) | 1.5 |

Figure 2:
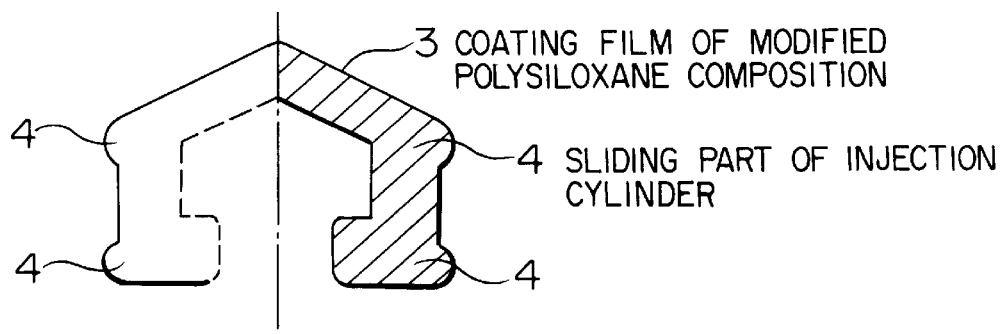
FIG. 2 is a cross-sectional view of another embodiment of a sealing and sliding stopper for an injector according to the present invention.

The above described rubber composition was kneaded using rolls according to SRIS 3602 (1972) (The Society of Japan Rubber Industry) and then subjected to vulcanizing and molding by means of a vulcanizing press at a temperature of 170° C. for 10 minutes to prepare a rubber stopper for a vial as shown in FIG. 1 or a sliding stopper for an injector (diameter: 15.3 mm, length 7.7 mm) as shown in FIG. 2.

b) Coating Rubber Surface with Modified Polysiloxane Composition

Coating liquids of the modified organopolysiloxane compositions (Examples 1 to 7) of the present invention and the prior art compositions (Comparative Examples 1 to 3), as shown in Table 2, were coated onto a rubber stopper as shown in FIG. 1 by spraying. The sliding stopper for an injector, as shown in FIG. 2, was coated by an immersion method.

TABLE 2

(parts by weight)

| | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Component A | | | | | | | | | | | |
| MM | Note 1) | 100 | — | — | 70 | — | 20 | 50 | — | — | — |
| MDM | 2) | — | 100 | — | 30 | — | — | — | — | — | — |
| MD3M | 3) | — | — | 100 | — | — | — | 20 | — | — | — |
| D3 | 4) | — | — | — | — | — | 5 | — | — | — | — |
| HM | 5) | — | — | — | — | — | — | 20 | — | — | — |
| HD3 | 6) | — | — | — | — | 100 | 70 | 10 | — | — | — |
| FM | 7) | — | — | — | — | — | 5 | — | — | — | — |
| Component B | | | | | | | | | | | |
| Dimethylpolysiloxane | 8) | — | 0.5 | 1.5 | 1 | 0.5 | 0.5 | 1 | 1 | 0.6 | — |
| Methylvinylpoly-siloxane | 9) | 1 | 0.5 | — | 0.5 | — | 0.5 | 0.5 | 0.1 | — | 0.1 |
| Methylhydropoly-siloxane | 10) | — | — | — | 0.5 | 0.5 | 0.5 | 0.5 | — | — | 1 |
| Others | | | | | | | | | | | |
| Benzoyl Ethyl Ether | 11) | — | 0.03 | 0.03 | 0.03 | 0.03 | 0.03 | 0.03 | 0.03 | 0.03 | 0.03 |
| Diisobutyl Peroxide | 12) | 1 | 0.7 | 0.5 | 0.8 | 0.5 | — | 1.5 | 1.5 | 1.5 | 1.5 |
| Di-t-butyl Peroxide | 13) | — | — | — | — | — | 0.5 | — | — | — | — |
| Solvent | | | | | | | | | | | |
| Ethyl Acetate | | — | — | — | — | — | — | — | 100 | — | — |
| n-Hexane | | — | — | — | — | — | — | — | — | 100 | 100 |

Note :
1) linear, BP 100° C., viscosity 0.63 cs (25° C.)
2) linear, BP 153° C., viscosity 1.04 cs (25° C.)
3) linear, BP 229° C., viscosity 2.07 cs (25° C.)
4) cyclic, BP 134° C., MP 64.5° C., solid
5) linear, BP 85° C.
6) cyclic, BP 93° C.
7) cyclic, BP 95° C./3 mmHg
8) linear, degree of polymerization n = about 120, volatile constituents 0.001%/100° C., viscosity 1,000 cps (25° C.)
9) linear, degree of polymerization n = about 120, volatile constituents 0.01%/100° C., vinyl group 0.5 mole %, viscosity 1,000 cps (25° C.)
10) linear, degree of polymerization n = about 120, volatile constituents 0.1%/100° C., hydroxyl group 0.2 mole %, viscosity 1,000 cps (25° C.)
11) Seiko BBE (commercial name, made by Seiko Kagaku KK, MP 58–60° C.)
12) Peroyl IB (commercial name, made by Nippon Yushi KK)
13) Peroyl D (commercial name, made by Nippon Yushi KK)

The thus coated rubber stoppers were treated by a circulation type thermostatic drier at 110° C. for 3 to 5 minutes or passed through a distance of 5 to 10 cm under a fluorescent lamp with a wavelength of 200 to 500 μm (output 4 W, calcium halophopsphate) for 5 to 15 seconds, for the samples of Examples 1 to 7, and the modified polysiloxane compositions were crosslinked to form films.

In Comparative Examples 1 to 3, the thus coated rubber stoppers were treated by a circulation type thermostatic drier at 110° C. for 3 to 30 minutes.

In any case, the crosslinking condition was so adjusted that the modified polysiloxane composition had a thickness of about 1 μm.

c) Estimation Test

The rubber articles of the present invention and the comparative articles, obtained as described above, were subjected to estimation tests described below. The results are shown in Table 3.

I) Quantity of Polysiloxane Peeled off from Rubber Surface 10 rubber stoppers for medicaments were adequately washed and charged in a clean and wide-mouthed bottle of 500 ml to which 300 m of fine particles-free was then added, and the bottle was shaken gradually for 20 minutes and allowed to stand for 60 minutes as it was. The resulting liquid was then subjected to measurement of the turbidity in the water by flowing it at a flow rate of 8 ml/min to count the number of particles of 5 to 10 μm in diameter using an automatic counter of fine particles in a liquid (HIAC-made by ROYCO Co., RION Co.). The measured turbidity is referred to as "peeling quantity". The average values of the three measurements are shown in Table 3, as the peeling quantity of polysiloxane per one rubber stopper.

minutes. The quantity of silicon in the thus extracted polysiloxane was measured by an atomic absorption spectrometry method to calculate the quantity of the polysiloxane (unit: μg) from the calibration curve obtained from the standard article of dimethylpolysiloxane to obtain results shown in Table 3, as the quantity of polysiloxane adhered per one rubber stopper.

IV) Elution Test

According to "Test Method of Rubber Stopper for Liquid Transfusion" of 11th Revision, Japanese Pharmacopoeia, about 20 g of a rubber stopper for medicaments was taken in a quartz beaker, to which distilled water was added in an amount of 10 times as much as the rubber stopper, the mouth of the beaker being covered with a clean aluminum foil and then heated at 121° C. for 60 minutes in an autoclave. The eluted solution was subjected to the above described standard method.

d) Test Results

It is apparent from Tables 2 and 3 of Examples 1 to 7 that the sanitary rubber articles of the present invention, each being obtained by coating a surface of a rubber stopper or sliding stopper with the modified organopolysiloxane composition, followed by crosslinking and bonding, exhibited more excellent lubricity as represented by the very smaller sliding values (0.1–) and very smaller values as to Peeling Quantity of Polysiloxane, as compared with Comparative Examples 1 to 3, and stood the standard values provided by Japanese Pharmacopoeia, as the quality standard of a saniatry rubber article.

TABLE 3

| | Example | | | | | | | Comparative Example | | | JP 12 Standard |
|---|---|---|---|---|---|---|---|---|---|---|---|
| | 1 | 2 | 3 | 4 | 5 | 6 | 7 | 1 | 2 | 3 | Values |
| Peeling Quantity of Polysiloxane (number) | 23 | 18 | 22 | 12 | 35 | 30 | 27 | 743 | 1055 | 1242 | |
| Sliding Value (kg) | 0.1–0.3 | 0.1–0.4 | 0.2–0.4 | 0.1–0.3 | 0.1–0.3 | 0.2–0.4 | 0.1–0.3 | 2.4–3.1 | 2.6–3.6 | 3.3–4.2 | |
| Quantity of Polysiloxane (μg) | 163 | 153 | 141 | 175 | 166 | 142 | 169 | 57 | 63 | 51 | |
| Test Items of JP | | | | | | | | | | | |
| Property (Permeability %) | 100.0 | 100.0 | 99.9 | 99.9 | 100.0 | 99.9 | 100.0 | 98.2 | 97.6 | 97.9 | |
| Foaming (min) | <1 | <1 | <1 | <1 | <1 | <1 | <1 | ≧3 | ≧3 | ≧3 | |
| pH | 0.2 | 0.1 | 0.1 | 0.2 | 0.1 | 0.1 | 0.2 | 0.3 | 0.2 | 0.3 | |
| Eluted Zinc (μg) | 0.0 | 0.0 | 0.0 | 0.0 | 0.0 | 0.0 | 0.0 | 0.0 | 0.0 | 0.0 | |
| $KMnO_4$ Reducing Materials (ml) | 0.6 | 0.8 | 0.7 | 0.6 | 0.6 | 0.9 | 0.7 | 1.3 | 1.7 | 2.2 | ≦2.0 ml |
| Evaporation Residue (mg) | 0.1 | 0.2 | 0.1 | 0.2 | 0.1 | 0.3 | 0.3 | 1 | 2.2 | 3.5 | ≦2.0 mg |
| UV Absorption Spectrum (Absorbence) | 0.02 | 0.03 | 0.03 | 0.04 | 0.03 | 0.03 | 0.03 | 0.1 | 0.2 | 0.3 | upto wavelength 220–350 nm, ≦0.2 |

II) Sliding Property

A sliding stopper for an injector, having a film formed on its surface, was provided with a push rod and inserted in an outer cyclinder of the injector. During the same time, a resistance value (unit: kg) when the sliding stopper was forcedly moved in the cylinder was measured by means of an autograph (AG-100B—commercial name—made by Shimazu Seisakujo KK) to obtain results shown in Table 3.

III) Quantity of Polysiloxane Adhered 100 ml of chloroform was added to 5 rubber stoppers in an Erlenmeyer flask of 100 ml and shaked for about 5

Examples 8 to 13 and Comparative Examples 4 to 10

To the total 100 parts by weight of 70 parts by weight of $(CH_3)_3SiO(CH_3)_3$ (MM) and 30 parts by weight of $(CH_3)_3(CH_3)_2SiOSi(CH_3)_3$ (MDM), as Component A, were added 1 part by weight of dimethylpolysiloxane, 0.5 part by weight of methylvinylpolysiloxane and 0.5 part by weight of methylhydropolysiloxane, as Component B, and 0.03 part by weight of benzoin ethyl ether and 0.8 part by weight of diisobutyl peroxide to prepare a modified polysiloxane composition, which was coated onto the rubber stopper (FIG. 1) or sliding stopper (FIG. 2) repared in an analogous manner to Examples 1 to 7 and Comparative Examples 1 to 3, by spraying, and then crosslinked and bonded under the treating conditions shown in Examples 8 to 10 of Table 4 to form coating films.

The composition compounded in a proportion shown in Example 1 of Table 2 was coated onto the rubber stopper (FIG. 1) and sliding stopper (FIG. 2) by spraying and then treated under the conditions of Examples 11 to 13 of Table 4.

For comparison, similarly, 1 part by weight of dimethylpolysiloxane, 0.1 part by weight of methylvinylpolysiloxane, 0.03 part of benzoin ethyl ether and 1.5 parts by weight of diisobutyl peroxide were added to 100 parts by weight of ethyl acetate, stirred and dissolved to prepare a composition, which was then coated onto the rubber stopper (FIG. 1) and sliding stopper (FIG. 2) by spraying and treated under the conditions of Comparative Examples 4 to 10.

As can be seen from Table 4, the resulting articles each showed a larger quantity of polysiloxane adhered and better sliding value in spite of that the treating time was very short in Examples 8 to 10. In Examples 11 to 13, the treating time or strength of the crosslinked film and stripping of the coating film, etc.

Since the modified polysiloxane composition of the present invention has a higher reactivity and stability, the resulting film applied to a rubber surface is more homogeneous and excellent in lubricity, film strength and bonding strength and has a longer durability. The sanitary rubber article of the present invention can be produced with a higher productivity while maintaining the quality thereof in stable manner.

Furthermore, the sanitary rubber article coated with the modified organopolysiloxane composition according to the present invention has the advantages that the sliding value (lubricity) of the rubber stopper for a medical instrument or device and for a medicament is rendered stable and improved by forming a film with a high bonding strength in stable manner, the rubber article stands the standard values according to "Test Method of Rubber Stopper for Liquid Transfusion" of 12th Revision, JP and has very high quality in sanitary property without feeding foreign matters, contaminants or insoluble fine particles to an injection liquor. Utilization of the sanitary rubber article serves to realize a medical treatment with a high safety.

TABLE 4

| Treating Conditions | Example | | | | | | Comparative Example | | | | | | |
|---|---|---|---|---|---|---|---|---|---|---|---|---|---|
| | 8 | 9 | 10 | 11 | 12 | 13 | 3 | 4 | 5 | 6 | 7 | 8 | 9 |
| UV Lamp | | | | | | | | | | | | | |
| Irradiation Time (sec) | 2 | 5 | 15 | — | — | — | 5 | 15 | 45 | — | — | — | — |
| Heating 110° C. (min) | — | — | — | 3 | 5 | 10 | — | — | — | 5 | 10 | 30 | 60 |
| Quantity of Polysiloxane Adhered (µg) | 150 | 172 | 163 | 102 | 125 | 133 | 49 | 54 | 57 | 22 | 31 | 38 | 82 |
| Sliding Value (kg) | 0.1–0.4 | 0.1–0.2 | 0.1–0.2 | 0.3–0.6 | 0.2–0.5 | 0.1–0.4 | 3.5–4.3 | — | — | 5.8– | — | — | 1.3–2.0 | was somewhat longer, i.e. 3 to 10 minutes than in Examples 8 to 10, but more excellent coating films in the quantity of polysiloxane adhered and sliding value were obtained, as compared with Comparative Examples.

In contrast, in Comparative Examples 4 to 10, there were obtained only coating films inferior in the quantity of polysiloxane adhered and lubricity.

In the above described Examples and Comparative Examples, the modified polysiloxane composition of the present invention exhibited more shortened treating time and more stable values in the quantity of polysiloxane adhered, as compared with Comparative Examples. This is probably due to that the modified polysiloxane composition of the present invention had a larger reaction rate independently of the treating methods such as heating treatments or irradiation methods of high energy beams and the real time until finishing of the reaction was thus constant.

It will clearly be understood from the foregoing illustrations that the important problems on the quality of a sanitary rubber article which have been considered difficult to be solved by the prior art can be solved by a technique for improving the quality of a sanitary rubber artile comprising coating the surface thereof with a polysiloxane composition according to the present invention, for example, prevention of fine particles generated due to rubbing of the sanitary article by decreasing the friction resistance of the surface, lowering of the lubricity during passage of time or generation of foreign matters due to lacking in the bonding strength

What is claimed is:

1. A sanitary rubber article whose surface is coated with a film, having a thickness of 0.1 to 50 µm, of a crosslinked modified polysiloxane composition comprising the following Component A and the following Component B, Component B being present in a proportion of 0.1 to 5 parts by weight to 100 parts by weight of Component A, Component A at least one organosiloxane having a recurring unit represented by the following General Formula (I):

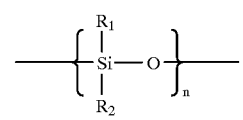

wherein $R_1$ is an alkyl group containing 1 to 7 carbon atoms, $R_2$ is a group selected from the group consisting of non-substituted or fluorine-substituted alkyl groups containing 1 to 4 carbon atoms, phenyl group and vinyl group, $R_1$ and $R_2$ may be same or different and n is an integer of 1 to 10, Component B at least one organopolysiloxane having a recurring unit represented by the following General Formula (II):

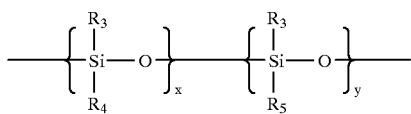

wherein $R_3$ is a group selected from the group consisting of non-substituted or fluorine-substituted alkyl groups containing 1 to 7 carbon atoms and phenyl group, $R_4$ is a group or atom selected from the group consisting of alkenyl groups, epoxy group, acryloyl group, vinyloxy group, maleimide group, vinyl group, phenylketone group, hydroxyl group and hydrogen atom, $R_5$ is a group selected from the group consisting of alkyl groups containing 1 to 7 carbon atoms, alkoxy groups containing 1 to 4 carbon atoms, amino group and carboxyl group, x and y are integers in the range of $1 \leq x \leq 40$ and $20 \leq x+y \leq 50,000$, the viscosity of the composition, prior to crosslinking, being controlled with an organic solvent selected from the group consisting of methyl ethyl ketone, diethyl ketone, toluene, acetone, 1,1,1-trichloroethane, n-hexane, trichlorotrifluoroethane and tetrahydrofuran, and the composition further comprising at least one member selected from the group consisting of sensitizer and radical producing agent.

2. The sanitary rubber article as claimed in claim 1, wherein the Component A is at least one member selected from the group consisting of acyclic organopolysiloxanes and cyclic organopolysiloxanes.

3. The sanitary rubber article as claimed in claim 1, wherein the sensitizer is an aromatic ketone.

4. The sanitary rubber article as claimed in claim 1, wherein the radical producing agent is an organic peroxide.

5. The sanitary rubber article as claimed in claim 1, wherein the sensitizer is present in a proportion of 0.02 to 2 parts by weight to 100 parts by weight of the composition.

6. The sanitary rubber article as claimed in claim 1, wherein the radical producing agent is present in a proportion of 0.01 to 3 parts by weight to 100 parts by weight of the composition.

7. The sanitary rubber article as claimed in claim 1, wherein the composition further comprises at least one antioxidant in a proportion of 0.01 to 0.5 part by weight to 100 parts by weight of the composition.

* * * * *